(12) United States Patent
Ohkuma et al.

(10) Patent No.: US 6,176,217 B1
(45) Date of Patent: Jan. 23, 2001

(54) FUEL VAPOR PROCESSING APPARATUS AND METHOD OF INTERNAL COMBUSTION ENGINE

(75) Inventors: Shigeo Ohkuma, Atsugi; Masaya Furushou, Yokohama, both of (JP)

(73) Assignees: Unisia Jecs Corporation; Nissan Motor Co., Ltd., both of Kanagawa-ken (JP)

( * ) Notice: Under 35 U.S.C. 154(b), the term of this patent shall be extended for 0 days.

(21) Appl. No.: 09/384,030

(22) Filed: Aug. 26, 1999

(30) Foreign Application Priority Data

Aug. 27, 1998 (JP) .................................................. 10-242220

(51) Int. Cl.[7] .......................... F02D 41/02; F02M 25/08; F02B 17/00
(52) U.S. Cl. ........................................... 123/295; 123/520
(58) Field of Search ..................................... 123/295, 430, 123/518, 519, 520, 698

(56) References Cited

U.S. PATENT DOCUMENTS 6,079,397 * 6/2000 Matsumoto et al. ............. 123/295 X

FOREIGN PATENT DOCUMENTS

| 59-37236 | 2/1984 | (JP) . |
| 7-42588 | 2/1995 | (JP) . |
| 11-36921 | * 2/1999 | (JP) . |

* cited by examiner

*Primary Examiner*—Tony M. Argenbright
(74) *Attorney, Agent, or Firm*—McDermott, Will & Emery

(57) ABSTRACT

With the present invention, the combustion method of an internal combustion engine is switched between homogeneous combustion and stratified combustion according to the operating conditions of the engine, and when purging of the fuel vapor is performed during the homogeneous combustion and purging of the fuel vapor is either reduced or prohibited during the stratified combustion, the combustion method is forcedly switched to the homogeneous combustion by the most suitable cycle during the stratified combustion, so as to perform purging of the fuel vapor. Therefore, the fuel temperature inside the fuel tank is detected, and according to the detected fuel temperature, the forced switching cycle for switching from the stratified combustion to the homogeneous combustion is set variably. Actually, the forced switching cycle is set shorter when the fuel temperature is higher.

12 Claims, 4 Drawing Sheets

FUEL VAPOR PROCESSING APPARATUS AND METHOD OF INTERNAL COMBUSTION ENGINE

BACKGROUND OF THE INVENTION (1) Field of the Invention

The present invention relates to a fuel vapor processing apparatus and method of an internal combustion engine, and particularly to a fuel vapor processing apparatus and method where the combustion method is switched between homogeneous combustion and stratified combustion according to operating conditions of the engine.

(2) Related Art of the Invention

The conventional fuel vapor processing apparatus of an internal combustion engine for vehicles are equipped with a canister for adsorbing the fuel vapor generated in a fuel tank, and a purge control valve mounted in a purge passage extending from the canister to an intake system of the engine for controlling the purging quantity of the fuel vapor (refer to Japanese Unexamined Patent Publication No. 7-42588).

On the other hand, a direct injection-spark ignition internal combustion engine where fuel is directly injected to the combustion chamber is being widely noticed recently. In this type of engine, it is common to switchingly control the combustion method in accordance with the operating conditions of the engine. The combustion method is switchingly controlled between a homogeneous combustion where fuel is injected during the intake stroke so as to diffuse the fuel in the combustion chamber to form a homogeneous mixture, and a stratified combustion where fuel is injected during the compression stroke so as to form a stratified mixture centralizing around the ignition plug (refer to Japanese Unexamined Patent Publication No. 59-37236).

When the combustion method is switchingly controlled, if purging of the fuel vapor is performed during the stratified combustion in the same manner as during the homogeneous combustion, the introduction of the fuel vapor generates a very rich air-fuel ratio condition for stratified combustion, since the target air-fuel ratio during the stratified combustion is set to a very lean level. This exerts undesirable influence on the operating performance and exhaust air. Therefore, during the stratified combustion, the purging of the fuel vapor is either reduced or prohibited.

However, when the stratified combustion is continuously performed, if the purging of the fuel vapor is reduced or prohibited during the stratified combustion mode, the canister may overflow and the vapor may be discharged to the atmosphere. In order to prevent such overflow, there is a need to increase the capacity of the canister, which leads to increase of the manufacturing cost.

Therefore, during stratified combustion, the combustion method is forced to be switched temporarily to the homogeneous combustion by a predetermined cycle, so as to perform the purging of the fuel vapor. The cycle is set in accordance with the vehicle speed, which is set to be shorter as the speed increases.

However, the trend in the vehicle speed and the generation quantity of the fuel vapor may vary, and there are cases where the stratified combustion may not be switched to the homogeneous combustion by the best cycle. In some cases, the forced switching cycle is too long, which leads to overflow of the canister and discharge of the vapor to the atmosphere, or too short in other cases, which leads to deterioration of the fuel economy.

Accordingly, the present invention aims at switching the stratified combustion to the homogeneous combustion by the best cycle, so as to prevent the overflow of the canister, and at the same time, improve fuel economy.

SUMMARY OF THE INVENTION

The present invention premises that a fuel vapor processing apparatus and method of an internal combustion engine comprises a combustion method switching device for switching the combustion method between homogeneous combustion and stratified combustion according to the operating conditions of the engine, and a purge control device for controlling, according to said combustion method, a purge control valve equipped in a purge passage extending from a canister for adsorbing the fuel vapor generated in a fuel tank to an intake system of the engine, so that purging of the fuel vapor is performed during the homogeneous combustion and purging of the fuel vapor is either reduced or prohibited during the stratified combustion.

The fuel vapor processing apparatus according to the present invention comprises a forced switching device for forcedly switching the combustion method to the homogeneous combustion temporarily according to predetermined cycles while performing the stratified combustion by said combustion method switching device so that purging of the fuel vapor is performed, a fuel temperature detecting device for detecting the fuel temperature, and a forced switching cycle setting device for variably setting said cycle for forcedly switching the combustion method from the stratified combustion to the homogeneous combustion according to the fuel temperature, so that said cycle is set shorter when the fuel temperature is higher.

According to the above-mentioned constitution, since the fuel temperature which is highly correlated with the amount of generated fuel vapor may be detected, and according to the detected fuel temperature, the cycle for forcedly switching the combustion method from the stratified combustion to the homogeneous combustion may be set variably, the combustion method can be switched by the most suitable cycle, to improve the purge balance, and to achieve prevention of overflow of the canister and improvement of the fuel economy.

Further, it is preferred that the fuel temperature detecting device detects the fuel temperature inside the fuel tank. The temperature of the fuel inside the fuel tank which is most closely related with the amount of generated fuel vapor is detected, thus achieving the further improvement.

Moreover, it is preferred that the forced switching cycle setting device varies said cycle continuously according to the fuel temperature. This enables the control with even higher accuracy.

Even further, it is preferred that the forced switching cycle setting device sets said cycle to a maximum value when the fuel temperature is equal to or lower than a predetermined value. This enables to substantially prohibit the periodical switching of the combustion method to the homogeneous combustion while the fuel temperature is low which means that there is no need to consider the generation of the fuel vapor, which leads to the further improvement of the fuel economy.

Moreover, the period of time for performing the forcedly switched homogeneous combustion by said forced switching device may simply be set to a fixed time, but it may preferably be varied according to the fuel temperature. However, when the fuel temperature is higher, more fuel vapor is generated, therefore the time for forcedly performing the homogeneous combustion is preferably set longer.

The characteristic structure of the present invention and the functions and effects based on such structure will become apparent by the following explanation on the preferred embodiment of the invention in connection with the accompanied drawings.

DETAILED DESCRIPTION OF THE PREFERRED EMBODIMENT

Figure 1:
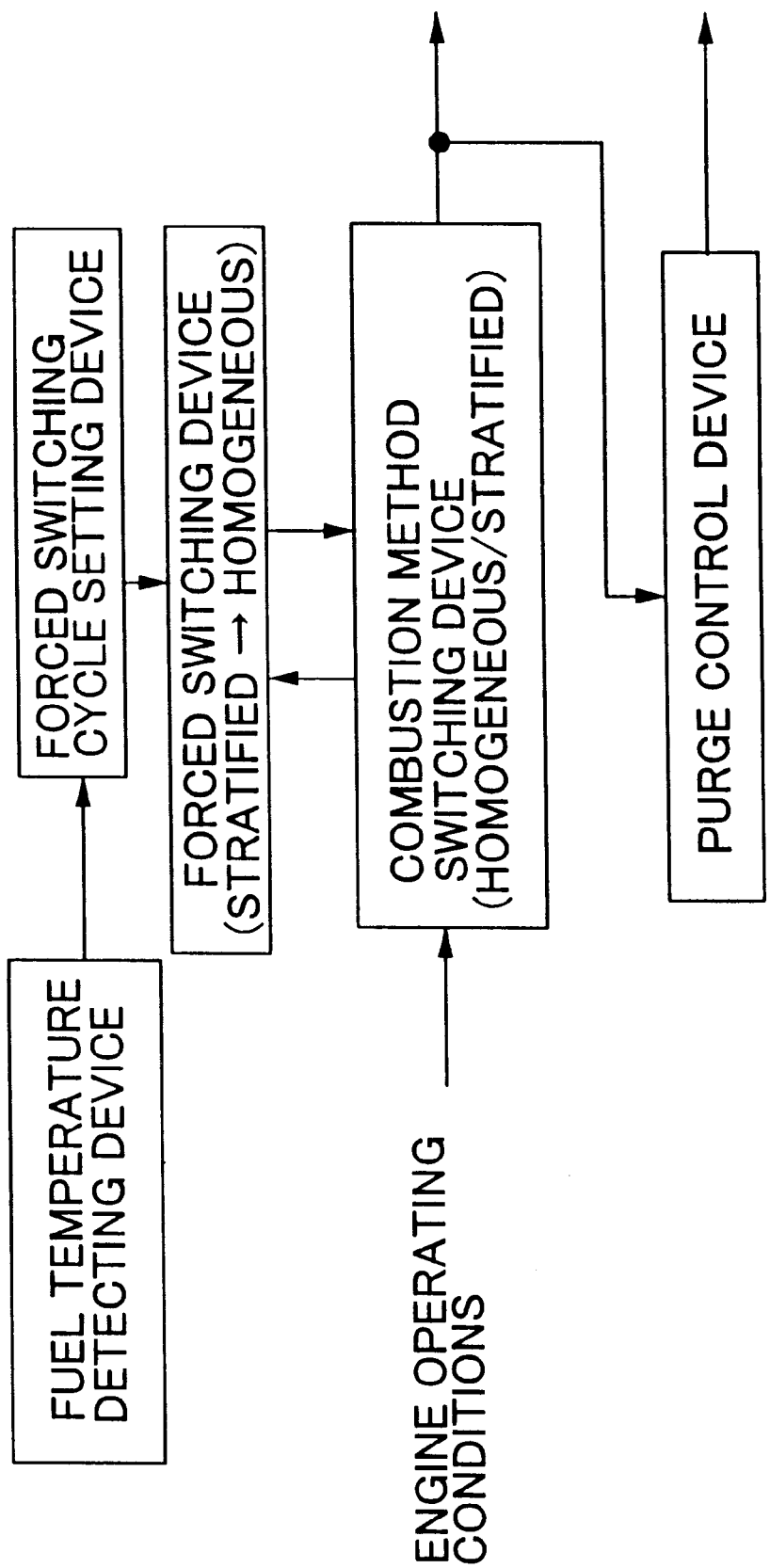
FIG. 1 is a functional block diagram showing the basic structure of the present invention.

The basic structure of a fuel vapor processing apparatus for an internal combustion engine according to the present invention is shown in FIG. 1, and the preferred embodiment thereof is explained with reference to FIGS. 2 through 5.

Figure 2:
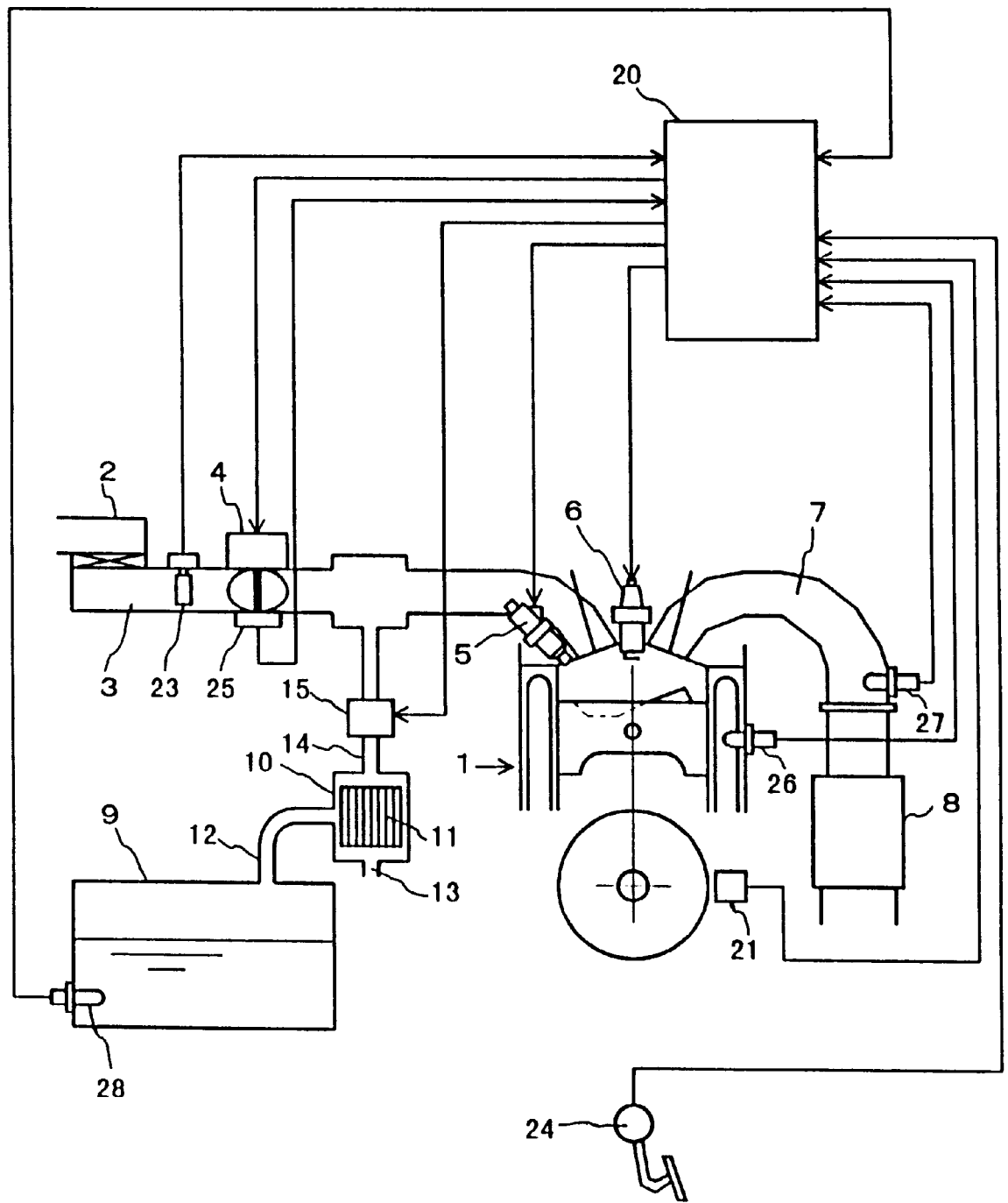
FIG. 2 is a system diagram showing the direct injection-spark ignition internal combustion engine according to one embodiment of the present invention.

FIG. 2 is a system diagram showing a direct injection-spark ignition internal combustion engine according to one embodiment of the present invention. The following is an explanation on FIG. 2.

Air is inducted through an air cleaner 2 and flows through an intake passage 3, to a combustion chamber formed to each cylinder of an internal combustion engine 1 to be mounted on a vehicle, under the control of a throttle valve 4 (an electronic controlled throttle valve in the embodiment) The opening of the electronic controlled throttle valve 4 is controlled through a step motor and the like operated by a signal received from a control unit 20.

There is provided a solenoid type fuel injector 5 for directly injecting fuel (gasoline) into the combustion chamber.

The fuel injector 5 is set to open its valve when power is supplied to the solenoid according to an injection pulse signal outputted from the control unit 20 either during the intake stroke or during the compression stroke in synchronism to the engine rotation, so as to inject the fuel adjusted to have a predetermined pressure. During the intake stroke injection, the injected fuel is diffused in the combustion chamber to form a homogeneous mixture, and during the compression stroke injection, the injected fuel forms a stratified mixture centralizing around an ignition plug 6. Then, the fuel is ignited by the ignition plug 6 based on the ignition signal received from the control unit 20, thereby performing combustion (homogeneous combustion or stratified combustion).

The exhaust from the engine 1 is discharged through an exhaust passage 7. A catalytic converter 8 for the exhaust emission is mounted on the exhaust passage 7.

A canister 10 working as a fuel vapor processing apparatus is mounted to a fuel tank 9 so as to process the fuel vapor generated in the tank 9. The canister 10 is formed by filling an adsorbent 11 such as an activated carbon to a sealed container. A fuel vapor introduction tube 12 is connected to the canister from the fuel tank 9. Accordingly, the fuel vapor generated in the fuel tank 9 for example while the operation of the engine 1 is stopped travels through the introduction tube 12 to the canister 10, and the fuel will be adsorbed thereto.

The canister 10 is also equipped with an air introduction opening 13 for introducing new air thereto, and a purge passage 14. The purge passage 14 is connected through a purge control valve 15 to the downstream side of the throttle valve 4 (intake manifold) of the intake passage 3. The opening of the purge control valve 15 is controlled according to duty signals from the control unit 20. When the purge control valve 15 is opened, the intake negative pressure of the engine 1 acts to the canister 10, and as a result, the fuel vapor adsorbed to the adsorbent 11 of the canister 10 is desorbed by the air introduced from the air introduction opening 13. A purged gas including the desorbed fuel vapor passes through the purge passage 14 into the downstream side of the throttle valve 4 of the intake passage 3, and thereafter, processed to be combusted in the combustion chamber of the engine 1.

The control unit 20 is equipped with a microcomputer including a CPU, a ROM, a RAM, an A/D converter, an input/output interface and the like. Signals from various sensors are inputted to the control unit 20.

The various sensors include a crank angle sensor 21 for detecting the crank shaft rotation of the engine 1, and based on signals from the crank angle sensor 21, the engine rotation speed Ne may be calculated.

Other sensors include an airflow meter 23 for detecting the intake air quantity Qa at the upstream side of the throttle valve 4 of the intake passage 3, an accelerator sensor 24 for detecting the step-in quantity of the accelerator pedal (accelerator opening) APO, a throttle sensor 25 for detecting the opening TVO of the throttle valve 4, a water temperature sensor 26 for detecting the cooling water temperature Tw of the engine 1, an oxygen sensor 27 mounted in the exhaust passage 7 for outputting signals corresponding to the rich/lean characteristics of the exhaust air-fuel ratio, and a fuel temperature sensor 28 for detecting the fuel temperature Tf inside the fuel tank 9.

The control unit 20 receives signals from various sensors, and performs a predetermined calculation process by the installed microcomputer, so as to entirely control the throttle opening of the throttle valve 4, the fuel injection quantity and injection timing of the fuel injector 5, the ignition timing of the ignition plug 6, and the opening of the purge control valve 15.

Among the above mentioned controls, the switching control of the combustion method and the related purge control will now be explained with reference to the flowchart.

Figure 3:
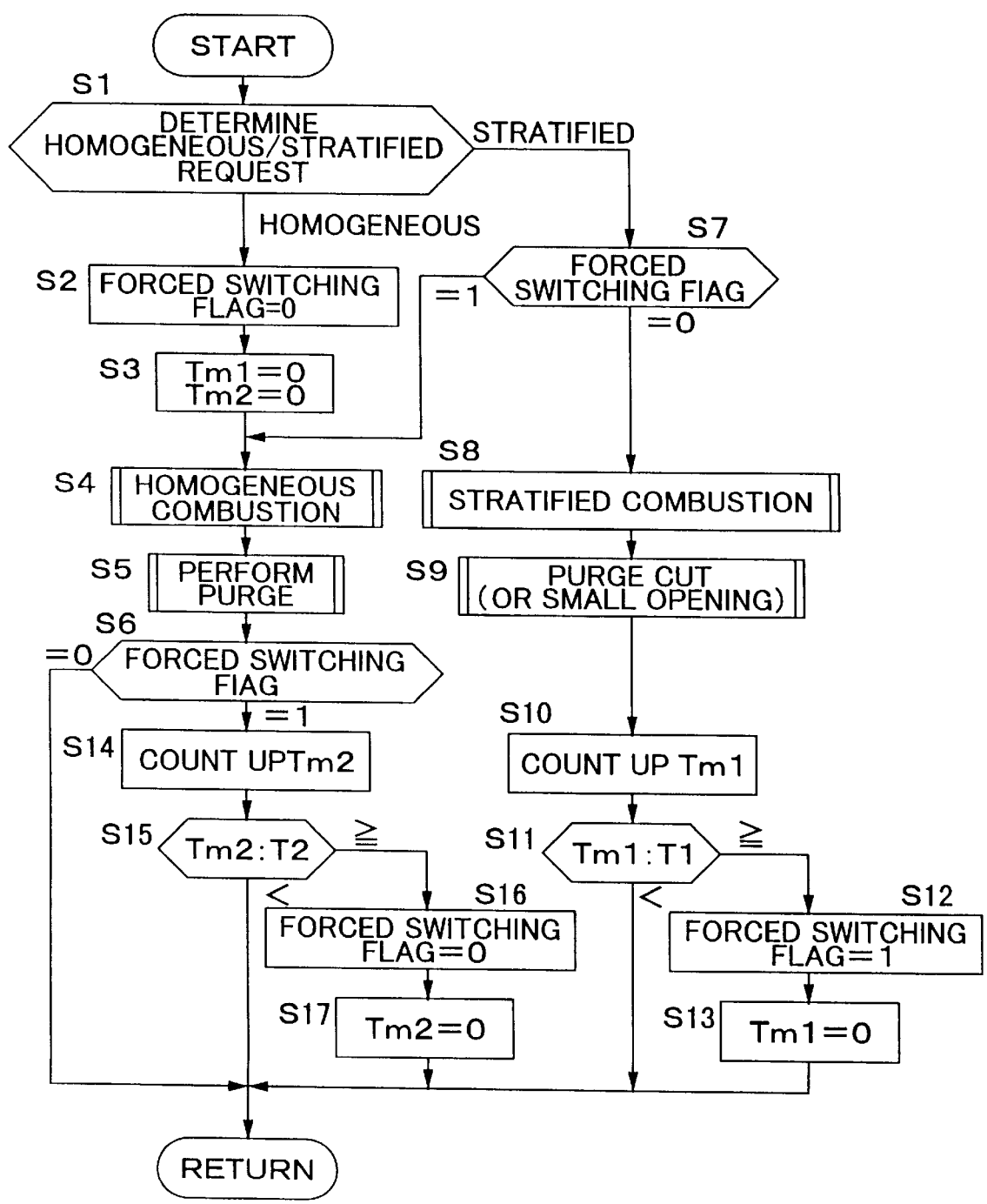
FIG. 3 is a flowchart of the combustion method switching routine.

FIG. 3 is a flowchart showing the combustion method switching routine, which will be performed once in every predetermined period of time.

In step 1 (steps referred to in the drawing as S1, S2 . . . ), determination is made on which of the homogeneous combustion or the stratified combustion is requested, based on the operating conditions of the engine.

Actually, a plurality of maps deciding the combustion method with the engine rotation speed Ne and the target torque tTe as parameters are equipped according to each condition such as the water temperature Tw or the time passed after starting the engine. The map selected according to these conditions are used to determine which of the homogeneous combustion or the stratified combustion is requested, based on the actual parameters.

The target torque tTe is set based on the accelerator opening APO and the engine rotation speed Ne.

When the homogeneous combustion is requested, in step 2, a forced switching flag is set to 0, and in step 3, a first timer Tm1 and a second timer Tm2 are set to 0. Then, procedure is advanced to steps 4 and 5.

In step 4, the fuel injection timing is set to the intake stroke, and the target air-fuel ratio is mainly set to stoichiometric ratio, and the operation of the fuel injector 5 is controlled, so as to perform the homogeneous combustion.

In step 5, the purge control valve 15 is opened (large opening), and purging of the fuel vapor is performed.

Thereafter, in step 6, the value of the forced switching flag is determined, and when the forced switching flag equals 0, then the present routine is terminated.

When the stratified combustion is requested, in step 7, the value of the forced switching flag is determined, and when the value equals 0, then the procedure is advanced to steps 8 and 9.

In step 8, the fuel injection timing is set to the compression stroke, and the target air-fuel ratio is set greatly toward the lean side (air-fuel ratio of approximately 40), and the operation of the fuel injector 5 is controlled, so as to perform the stratified combustion.

In step 9, the purge control valve 15 is either closed so as to prohibit purging of the fuel vapor, or the opening of the valve 15 is set small so as to reduce the purge quantity of the fuel vapor.

Thereafter, in step 10, the first timer Tm1 showing the continued time of stratified combustion is counted, and in step 11, it is determined whether the first timer Tm1 is greater than or equal to a predetermined forced switching cycle T1 or not. The forced switching cycle T1 is set according to the flowchart of FIG. 4 mentioned below.

When it is determined that T1 is greater than Tm1 (Tm1<T1), then the present routine is terminated so that the stratified combustion is continued according to request.

When the Tm1 is equal to or greater than T1 (Tm≧T1), the forced switching flag is set to 1 in step 12 so as to switch the combustion method forcedly to the homogeneous combustion for performing the purge, and in step 13, the first timer Tm1 is returned to 0, and the present routine is terminated.

Therefore, when performing the present routine next time, even when it is determined in step 1 that the stratified combustion is requested, since it is determined in step 7 that the forced switching flag equals 1, the procedure is advanced to steps 4 and 5, where the homogeneous combustion is performed and the purging is executed.

When the homogeneous combustion is performed in a forced manner as above, it is determined in step 6 that the forced switching flag is set to 1, so the procedure is advanced to steps 14 and 15.

In step 14, the second timer Tm2 showing the continued time of the homogeneous combustion by forced switching is counted, and in step 15, it is determined whether or not the second timer Tm2 is equal to or above a predetermined time T2 or not.

As a result of the determination, when T2 is greater than Tm2 (Tm2<T2), then the homogeneous combustion based on forced switching is continued, and the present routine is terminated.

When Tm2 is equal to or greater than T2 (Tm2≧T2), the forced switching flag is returned to 0 at step 16 so as to terminate the homogeneous combustion based on forced switching and to return the combustion method to the stratified combustion, and in step 17, the second timer Tm2 is returned to 0, and the present routine is terminated.

Accordingly, if it is determined in step 1 that the stratified combustion is requested when performing the present routine next time, then it is determined in step 7 that the forced switching flag equals 0, and the procedure is advanced to steps 8 and 9 for performing the stratified combustion, while the purging is cut.

By the control mentioned above, while performing the stratified combustion, the combustion method is forcedly switched to the homogeneous combustion temporarily (predetermined time T2) by a predetermined forced switching cycle T1, so as to perform purging of the fuel vapor.

In the routine, the portions of steps 1, 4 and 8 correspond to the combustion method switching device, steps 5 and 9 correspond to the purge control device, and steps 10, 11, 12, 7 correspond to the forced switching device.

Figure 4:
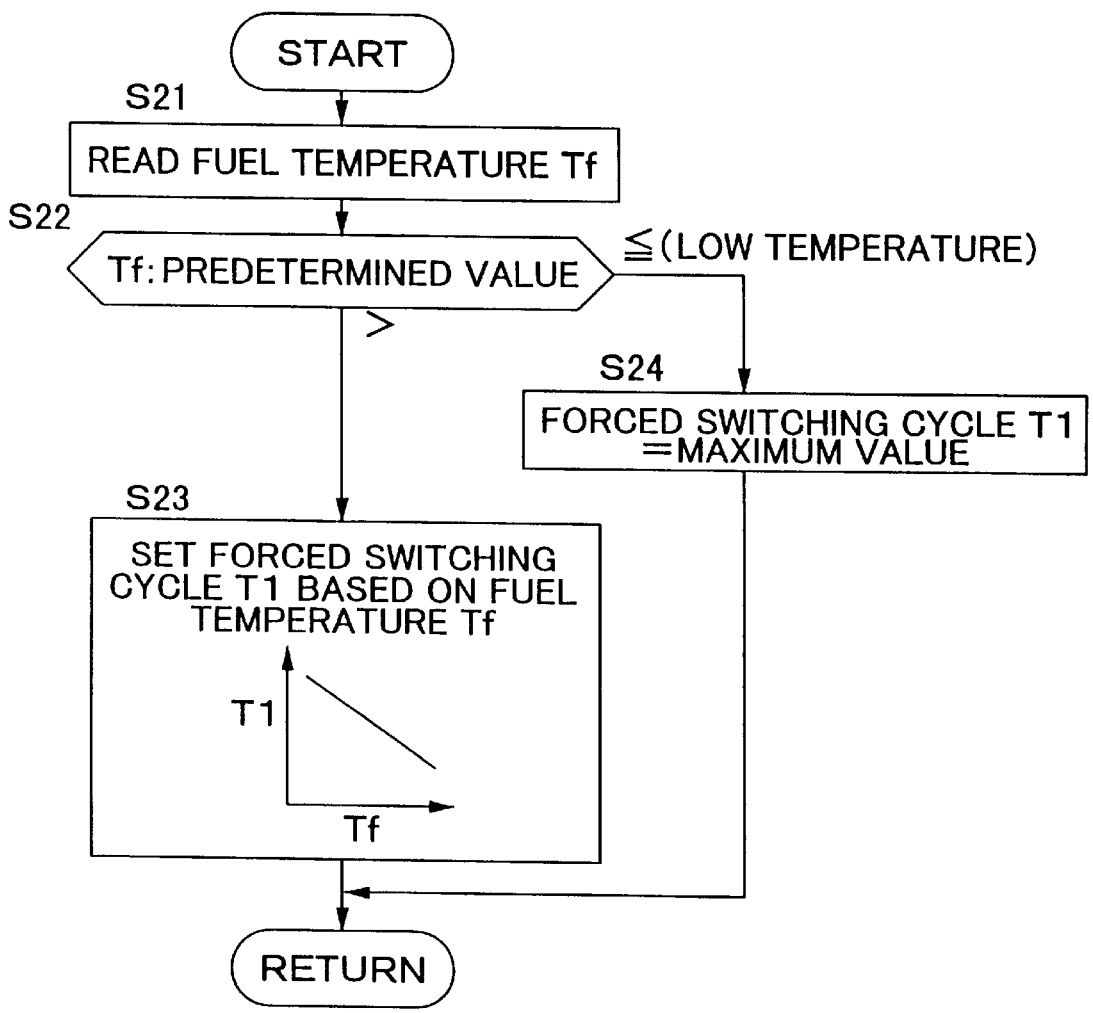
FIG. 4 is a flowchart of the forced switching cycle setting routine.

FIG. 4 is a flowchart showing the routine of setting the forced switching cycle T1, which will be performed once in every predetermined time.

In step 21, the fuel temperature Tf inside the fuel tank 9 is read in based on the signal from the fuel temperature sensor 28.

In step 22, the fuel temperature Tf is compared with the predetermined value of the low temperature side.

Based on the comparison, when the fuel temperature Tf is greater than the predetermined value (Tf>predetermined value), then the procedure is advanced to step 23, where a table is referred to which sets the forced switching cycle T1 according to the fuel temperature Tf so that the cycle becomes shorter as the fuel temperature Tf rises, and the forced switching cycle T1 (min) is set according to the fuel temperature Tf (° C.).

When the fuel temperature Tf is equal to or lower than the predetermined value (at low temperature) (Tf≦predetermined value), the procedure is advanced to step 24, where the forced switching cycle T1 is set to a maximum value.

As above, when the fuel temperature is high and much fuel vapor is generated, the forced switching cycle T1 is set to a shorter value, and the combustion is frequently switched to the homogeneous combustion, thereby increasing the processing quantity of the fuel vapor, and as a result, preventing the generation of odor.

When during the mid-fuel temperature where a small amount of fuel vapor is generated, the forced switching cycle T1 is set relatively long, and the combustion is switched to the homogeneous combustion at a timing where no odor may be generated. This enables not only to balance the purging but also to increase the fuel economy.

When the fuel temperature is low and only very little amount of fuel vapor is generated (when Tf<predetermined value), the forced switching cycle T1 is set to a maximum value, and the switching to the homogeneous combustion is confined (the cyclic switching to the homogeneous combustion is substantially prohibited), so as to improve the fuel economy.

In the routine, the portion mentioned in step 21 together with the fuel temperature sensor 28 correspond to the fuel temperature detecting device, and the portion of steps 22 through step 24 correspond to the forced switching cycle setting device.

In the present embodiment, it is explained that the forced switching cycle T1 is continuously varied in accordance with the fuel temperature Tf, but the cycle T1 may also be set to be varied gradually in steps. However, the steps of the cycle should desirably be subdivided at higher temperatures (for example, above 30° C.).

Further, the conditions where no fuel vapor may be generated is separately processed by steps 22 and 24, but the lower temperature cases may also be processed according to the table of step 23.

Figure 5:
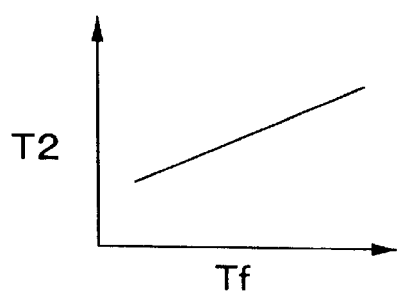
FIG. 5 is a diagram showing the example of setting the time for performing the forced homogeneous combustion.

Even further, the time T2 for performing the forced homogeneous combustion may be set to a fixed value when the combustion is switched forcedly and temporarily by a predetermined cycle to the homogeneous combustion during the stratified combustion, but the time T2 may be varied according to the fuel temperature Tf as shown in FIG. 5, similar to the forced switching cycle T1. That is, as the temperature of the fuel Tf rises, the amount of fuel vapor being generated is increased, so the time T2 for performing the forced homogeneous combustion should preferably be set longer.

As explained above, according to the present invention, the fuel temperature is detected which is highly correlative to the amount of generated fuel vapor. According to the fuel temperature, the forced switching cycle of the stratified combustion to the homogeneous combustion is variably set. Thus, the combustion method is effectively switched from the stratified combustion to the homogeneous combustion by the best cycle, thereby improving the purge balance, and achieving prevention of the overflow of the canister and improvement of the fuel economy.

What we claimed are:

1. A fuel vapor processing apparatus of an internal combustion engine comprising:

a combustion method switching means for switching the combustion method between homogeneous combustion and stratified combustion according to the operating conditions of said engine; and a purge control means for controlling a purge control valve equipped in a purge passage extending from a canister for adsorbing the fuel vapor generated in a fuel tank to an intake system of said engine according to said combustion method, so that purging of said fuel vapor is performed during said homogeneous combustion and purging of said fuel vapor is either reduced or prohibited during said stratified combustion; wherein said fuel vapor processing apparatus further comprises:

a forced switching means for forcedly switching the combustion method to said homogeneous combustion temporarily according to predetermined cycles while performing said stratified combustion by said combustion method switching means, so that purging of said fuel vapor is performed;

a fuel temperature detecting means for detecting the fuel temperature; and a forced switching cycle setting means for variably setting said cycle for forcedly switching the combustion method from the stratified combustion to the homogeneous combustion according to said fuel temperature, so that said cycle is set shorter when the fuel temperature is higher.

2. A fuel vapor processing apparatus of an internal combustion engine according to claim 1, wherein said fuel temperature detecting means detects the fuel temperature inside the fuel tank.

3. A fuel vapor processing apparatus of an internal combustion engine according to claim 1, wherein said forced switching cycle setting means varies said cycle continuously according to the fuel temperature.

4. A fuel vapor processing apparatus of an internal combustion engine according to claim 1, wherein said forced switching cycle setting means sets said cycle to a maximum value when the fuel temperature is equal to or lower than a predetermined value.

5. A fuel vapor processing apparatus of an internal combustion engine according to claim 1, wherein the period of time for performing the forcedly switched homogeneous combustion by said forced switching means is set to a fixed time.

6. A fuel vapor processing apparatus of an internal combustion engine according to claim 1, wherein the period of time for performing the forcedly switched homogeneous combustion by said forced switching means is set to be varied according to the fuel temperature.

7. A fuel vapor processing method of an internal combustion engine comprising the steps of:

switching the combustion method between homogeneous combustion and stratified combustion according to the operating conditions of said engine; and controlling a purge control valve equipped in a purge passage extending from a canister for adsorbing the fuel vapor generated in a fuel tank to an intake system of said engine according to said combustion method, so that purging of said fuel vapor is performed during said homogeneous combustion and purging of said fuel vapor is either reduced or prohibited during said stratified combustion; wherein said fuel vapor processing method further comprises the steps of:

forcedly switching the combustion method to said homogeneous combustion temporarily according to predetermined cycles while performing said stratified combustion, so that purging of said fuel vapor is performed;

detecting the fuel temperature; and variably setting said cycle for forcedly switching the combustion method from the stratified combustion to the homogeneous combustion according to said fuel temperature, so that said cycle is set shorter when the fuel temperature is higher.

8. A fuel vapor processing method of an internal combustion engine according to claim 7, wherein the fuel temperature inside the fuel tank is detected as the fuel temperature.

9. A fuel vapor processing method of an internal combustion engine according to claim 7, wherein said cycle is varied continuously according to the fuel temperature.

10. A fuel vapor processing method of an internal combustion engine according to claim 7, wherein said cycle is set to a maximum value when the fuel temperature is equal to or lower than a predetermined value.

11. A fuel vapor processing method of an internal combustion engine according to claim 7, wherein the period of time for performing the forcedly switched homogeneous combustion is set to a fixed time.

12. A fuel vapor processing method of an internal combustion engine according to claim 7, wherein the period of time for performing the forcedly switched homogeneous combustion is set to be varied according to the fuel temperature.

* * * * *